(12) United States Patent
Li et al.

(10) Patent No.: US 7,983,230 B1
(45) Date of Patent: Jul. 19, 2011

(54) ADAPTIVE POWER AND DATA RATE CONTROL FOR AD-HOC MOBILE WIRELESS SYSTEMS

(75) Inventors: Don Li, Franklin Park, NJ (US);
Kristina Carlin, Pearl River, NY (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 921 days.

(21) Appl. No.: 11/775,988

(22) Filed: Jul. 11, 2007

(51) Int. Cl.
*H04W 4/00* (2009.01)
*H04L 12/40* (2006.01)
*H04L 12/413* (2006.01)

(52) U.S. Cl. .................. 370/338; 370/445; 370/439

(58) Field of Classification Search .................. 370/338, 370/439, 445
See application file for complete search history.

(56) References Cited

U.S. PATENT DOCUMENTS

| | | | |
|---|---|---|---|
| 6,404,756 B1 | 6/2002 | Whitehill et al. | |
| 6,453,168 B1 | 9/2002 | McCrady et al. | |
| 6,643,469 B1 * | 11/2003 | Gfeller et al. | 398/162 |
| 6,904,021 B2 | 6/2005 | Belcea | |
| 6,937,641 B2 | 8/2005 | Li et al. | |
| 6,944,460 B2 | 9/2005 | Haartsen | |
| 6,970,714 B2 | 11/2005 | D'Souza et al. | |
| 7,587,173 B2 * | 9/2009 | Hoffmann et al. | 455/63.4 |
| 7,792,138 B2 * | 9/2010 | Hahm et al. | 370/462 |
| 2002/0172186 A1 * | 11/2002 | Larsson | 370/349 |
| 2005/0152465 A1 * | 7/2005 | Maltsev et al. | 375/260 |
| 2008/0144493 A1 * | 6/2008 | Yeh | 370/230 |

FOREIGN PATENT DOCUMENTS

WO  WO 2006064411 A2 *  6/2006

* cited by examiner

*Primary Examiner* — Marivelisse Santiago-Cordero
(74) *Attorney, Agent, or Firm* — Edell, Shapiro & Finnan, LLC

(57) ABSTRACT

A method for controlling transmit power of a node in wireless network, such as, e.g., an ad-hoc wireless network operating in accordance with a carrier sense multiple access (CSMA) protocol and where asymmetrical radio links may exist. During a request to send (RTS) and clear to send (CTS) exchange between a first node and a second node, both a request to send (RTS) packet and a probing request to send (PrRTS) packet are transmitted from the first node to the second node. The transmit power and data rate of the PrRTS packet may be different from the transmit power and data rate of the RTS packet. In response, the second node returns a CTS packet that includes a signal to noise ratio (SNR) for both the RTS packet and the PrRTS packet. A correction factor for data transmit power is then computed based in part on both the SNR for the RTS and the SNR for the PrRTS, and a data packet is thereafter transmitted at a power level that has been modified in accordance with the correction factor. The correction factor may further aid the estimation of the signal-to-noise-and-interference ratio (S/(N+I)) at a receiving node, which enables a sending node either to overcome the interference by adjusting the transmit power or avoid the interference by not accessing the channel until it hears the node again.

36 Claims, 8 Drawing Sheets

ADAPTIVE POWER AND DATA RATE CONTROL FOR AD-HOC MOBILE WIRELESS SYSTEMS

FIELD OF THE INVENTION

Embodiments of the present invention relate to telecommunications, and more particularly to methods of controlling and preferably reducing transmit power used by a given communications device (e.g., a radio) in a wireless network.

BACKGROUND OF THE INVENTION

In wireless cellular systems, transmit power control is desirable to minimize co-channel interference in order to maximize the number of active simultaneous traffic channels over an allocated frequency band, as discussed, for example, in K. S. Gilhousen, et al., "On the Capacity of Cellular CDMA Systems," IEEE Trans. on Vehicular Technology, vol. 40, May 1991, which is incorporated herein by reference. Without appropriate power control, a code division multiple access (CDMA) system would not be able to achieve the capacity needed to serve the ever-demanding wireless markets today. The ITU has adopted both 3GPP (Third Generation Partnership Project) and 3GPP2 CDMA technology standards for the worldwide, third generation wireless cellular systems.

Several power control techniques are used in today's wireless cellular systems, including those described in T. Ojanpera and R. Prasad, Eds., "Wideband CDMA for Third Generation Mobile Communications", Artech House Publishers, 1998; W. C. Y. Lee, "Mobile Cellular Telecommunications Systems", McGraw-Hill, 1989; and D. Li and G. Yang, "Power-controlled Random Access," U.S. Pat. No. 6,937,641, all of which are incorporated herein by reference. As is well-known by those skilled in the art, cellular systems typically use a high antenna tower (base station) to collect signals from mobile users and re-distribute signals in respective coverage areas. Also, one of the main goals of power control in cellular systems is to avoid the near-far effect.

In contrast to cellular systems, an ad-hoc wireless system is formed dynamically when a number of wireless nodes decide to join together to form a network. Each node communicates directly with many nodes rather than just one base station. Such a network uses peer-to-peer routing to form the network and route data messages across the network.

Because ad-hoc wireless networks operate substantially differently from cellular wireless systems, the power control techniques used or proposed for cellular systems are not suitable in an ad-hoc environment.

Power control and data rate control techniques for ad-hoc wireless networks have conventionally concentrated on the reservation channel by measuring the signal-to-noise ratio (SNR) of the received request to send (RTS) packet (including its variants: hello RTS (HRTS), broadcast RTS (BRTS), and packet RTS (PRTS)) in order to adjust the transmit power level and data rate on the message channel. The transmit power on the message channel may also be adjusted by the acknowledge (ACK) completion rate. Typically, when the ACK completion rate drops below a pre-configured threshold, the transmit power is increased first. If the power adjustment does not improve the ACK completion rate, the transmission data rate is then lowered. These adjustments are targeted at both improving the message completion rate and minimizing the battery power drain.

The basic ad hoc wireless network power control and data rate adjustment approach mentioned above is based on a theoretical symmetrical radio link. That is, it is assumed that the receive sensitivity on both the transmitting node and the receiving node is the same. However, the receive sensitivity can vary substantially among individual radios, sometimes by as much as 6 dB. In practice, ensuring a symmetrical link in an adhoc wireless system is, for all practical purposes, economically unfeasible in that the electronic radio components that would be needed to keep the tolerances to a very minimum level across a wide range of operating conditions, such as temperature, humidity, etc. would be too costly. In any event, there is no particular reason to have a symmetrical link design. Radios can operate just as well on an asymmetrical link.

As noted, the basic power and data rate adjustment technique discussed above is based solely on the measured SNR on the reservation channel. It has been determined that this may lead to an incorrect power level and data rate setting when the sender has a better receive sensitivity than the receiver.

When the sender assumes that the receiving node has the same receive sensitivity and sends the data packet based on its own measured SNR, the receiving node will not be able to demodulate the data correctly if its receive sensitivity is worse than the sender's. Conventional transmit techniques repeat transmissions at the same data rate and power level until the next evaluation period. Consequently, during a given control period, the sender unnecessarily wastes battery power and keeps the access channel busy with multiple failed access attempts by repeatedly sending multiple RTS-Data sequences, without receiving a corresponding ACK or NACK in return.

There have been several attempts at power control in ad-hoc wireless networks. For example, T. J. Kwon and M. Gerla, "Clustering with Power Control", IEEE MILCOM, vol. 2, pp 1424-1428, November 1999, describes an attempt to impose a cellular structure to an ad-hoc network topology. Each cluster head acts like a cellular base station. The authors propose to use the power control algorithms in a similar fashion, as used in cellular systems, to control the size of a cluster. This approach imposes a centralized resource distribution onto an ad-hoc wireless system. However, because an ad-hoc wireless system is distributed in nature, a distributed scheme would be a more efficient and flexible approach.

R. Ramanathan and R. Rosales-Hain, "Topology Control of Multihop Wireless Networks Using Transmit Power Adjustment", IEEE INFOCOM, vol. 2, pp. 404-413, March 2000, describes a similar approach, but formulates the problem differently, namely as an optimization problem. The authors determine the optimal number of neighbors that each node should have to minimize the maximum transmit power while maintaining connectivity constraint. In the technique that is proposed, the number of neighbors of a node is restricted by reducing the node's transmit power by a constant value. Such a restriction on the number of nodes inhibits the flexibility of the network.

J. Haartsen, "System and Method for Link Adaptation in Communication Systems," U.S. Pat. No. 6,944,460; J. M. Belcea, "System and Method for Providing Adaptive Control of Transmit Power and Data Rate in an Ad-Hoc Communications Network," U.S. Pat. No. 6,904,021; and R. M. D'Souza, S. Ramanathan, and D. T. Lang, "Adaptive Power Level Setting in an Ad-Hoc Wireless Network," U.S. Pat. No. 6,970,714, power-up and power-down control and data rate adjustment technique. However, the disclosed techniques that control the transmit power and data rate apply only to single-channel networking systems. These techniques do not address a multi-channel scheme that is required to achieve the high-capacity systems that are in demand today.

Thus, while previous proposals and implementations for transmit power control and data rate adjustment have addressed the cellular as well as relatively more harsh and dynamic ad-hoc networking environments, there remains a need for more effective power control techniques or methods for capacity-hungry mobile networks, especially ad-hoc networking systems.

SUMMARY OF THE INVENTION

Embodiments of the present invention provide a method for controlling the transmit power of a node in wireless network, such as, e.g., an ad-hoc wireless network operating in accordance with a carrier sense multiple access (CSMA) protocol. During a request to send (RTS) and clear to send (CTS) exchange between a first node and a second node, both a request to send (RTS) packet and a newly-provided probing request to send (PrRTS) packet are transmitted from the first node to the second node. The transmit power and data rate of the PrRTS packet may be different from the transmit power and data rate of the RTS packet. In response, the second node returns a CTS packet that includes a signal to noise ratio (SNR) for both the RTS packet and the PrRTS packet. A correction factor for data transmit power is then computed based in part on both the SNR for the RTS and the SNR for the PrRTS, and a data packet is thereafter transmitted at a power level that has been modified in accordance with the correction factor.

More specifically, embodiments of the present invention provide a method for controlling transmit power in which one of a hello request to send (HRTS) signal, broadcast request to send (BRTS) signal and packet request to send (PRTS) signal is received by a first node (e.g., a first radio) and a signal to noise ratio (SNR) for the one of the HRTS, BRTS, and PRTS signal is computed.

A transmit power for a probing RTS (PrRTS) signal is then computed based at least in part on the SNR of the one of the HRTS, BRTS and PRTS signal. Thereafter, both a conventional request to send (RTS) signal and the newly-provided PrRTS signal are transmitted. In response to the transmitted RTS and PrRTS signals, a second node, e.g., a second radio, sends a clear to send (CTS) signal that includes a SNR for both the RTS signal and the PrRTS signal. With this information, the first node computes a "SNR correction factor" based at least in part on the SNR for the RTS and PrRTS signals.

A data packet is then transmitted from the first node to the second node at a power level that is computed based at least in part on the SNR correction factor.

In accordance with a preferred implementation, the transmit power for the PrRTS (Pwr(PrRTS)) is computed in accordance with the following equation:

Pwr(PrRTS)=Pwr(data)−Pwr(data rate difference)−Pwr(frequency difference)

Where,

Pwr(data) is a predetermined data message transmit power in dBm,

Pwr(data rate difference) is a SNR value difference between a data rate of a data channel and a reservation channel at baseband in dB, and Pwr(frequency difference) is a frequency loss difference between the data channel and the reservation channel in dB.

Still in accordance with a preferred implementation, the SNR correction factor is computed in accordance with the following equation:

SNR Correction Factor=SNR_RTS−SNR_PrRTS−(Pwr_RTS−Pwr_PrRTS) in dB.

Where SNR_RTS and SNR_PrRTS are measured SNR on the RTS and PrRTS signal respectively, Pwr_RTS is the RTS transmit power, and Pwr_PrRTS is the transmit power of PrRTS.

The method may further comprise receiving an acknowledge (ACK) signal and thereafter recording the SNR correction factor in a database. The method may also comprise, prior to computing the transmit power and data rate for the PrRTS, determining whether the SNR for the one of the HRTS, BRTS, and PRTS signal is greater than a SNR to a support a minimum data rate.

The method may still further comprise transmitting the RTS and PrRTS signals at a predetermined maximum power and minimum a data rate when the SNR for the one of the HRTS, BRTS, and PRTS signal is less than a SNR to support a minimum data rate.

In accordance with an aspect of the invention, the PrRTS signal is transmitted immediately after transmitting the RTS signal. Also, the PrRTS signal may be transmitted over a reservation channel or a data channel. Notably, the RTS and PrRTS signals may be transmitted over different frequencies. The content of the PrRTS signal may be the same as the RTS signal or different.

In a possible implementation, the method may further include receiving an acknowledgement (ACK), a negative acknowledgement (NACK), or nothing in response to the step of transmitting the data packet. When an ACK is received, the SNR correction factor may then be recorded or stored.

The method may still further include determining whether a maximum power and minimum data rate have been reached, and if not, re-computing the transmit power for the PrRTS signal. Similarly, the method may include determining whether a predetermined number of retries have occurred if no response (e.g., a CTS signal) is received, and if not, re-transmitting both the RTS signal and the PrRTS signal.

As noted, embodiments of the invention are particularly applicable to controlling the transmit power of a node in an ad-hoc wireless network, such as a network operating substantially in accordance with a carrier sense multiple access (CSMA) protocol. However, those skilled in the art will appreciate that other types of networks and protocols might benefit from the methodology described herein.

These and other features of the several embodiments of the invention along with their attendant advantages will be more fully appreciated upon a reading of the following detailed description in conjunction with the associated drawings.

DETAILED DESCRIPTION

Figure 1:
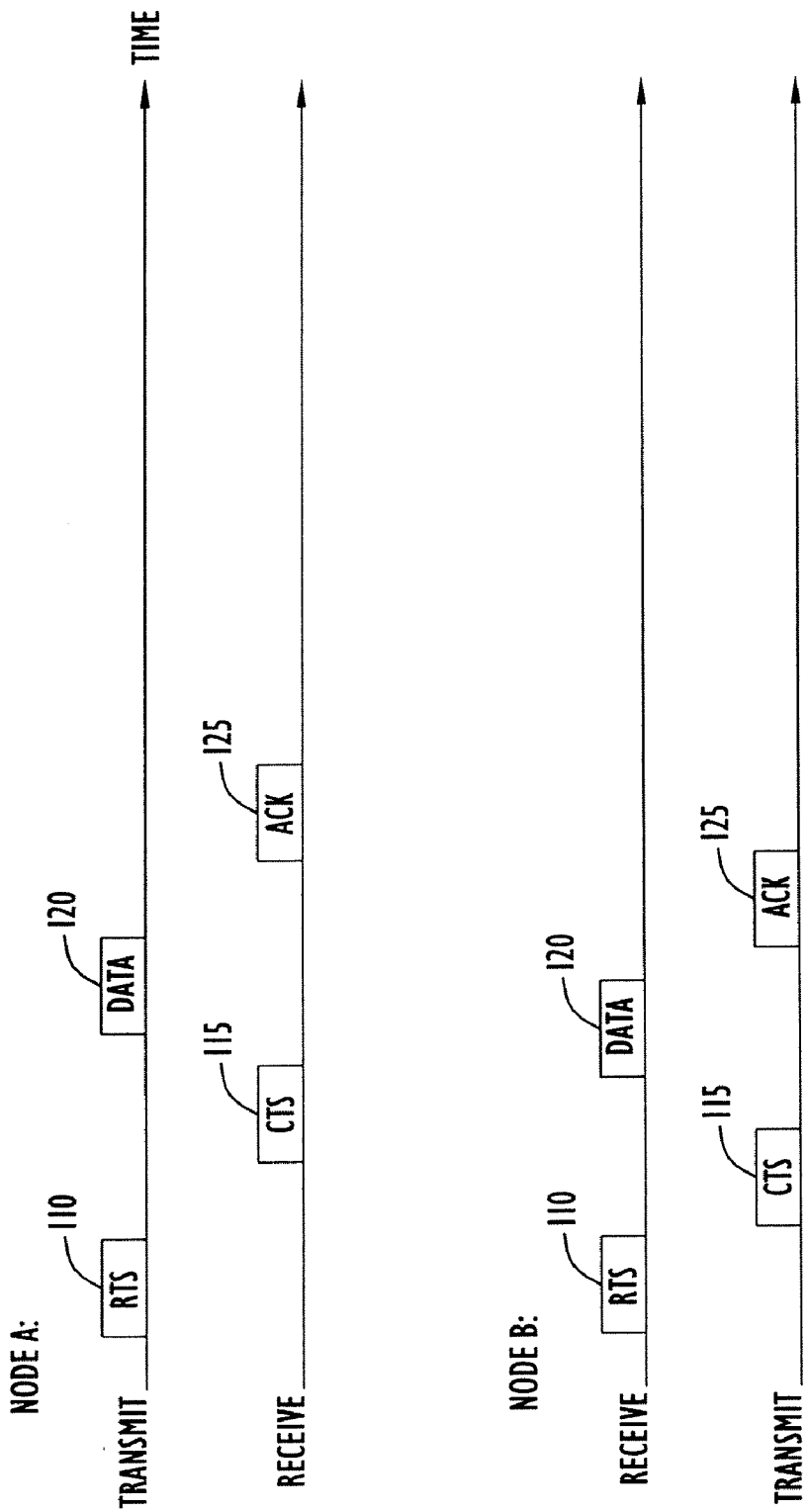
FIG. 1 is a diagram of a generic CSMA data exchange sequence.

FIG. 1 illustrates a conventional Carrier Sense Multiple Access (CSMA) sequence diagram where Node A requests and sends a data packet to Node B. CSMA is a conventionally-used protocol in, e.g., ad-hoc wireless networks. In the case shown, a single frequency is assigned to all logical channels (i.e., both the reservation and data channel use the same frequency). As shown, Node A transmits an RTS packet 110, which Node B receives. In response, assuming Node B was able to receive and properly demodulate (generically, "receive") the RTS packet 110, Node B sends a CTS packet 115. Thereafter, Node A sends data packet 120, which is received by Node B. Assuming data packet 120 was properly received, an ACK packet 125 is sent by Node B and received by Node A, thereby completing a data exchange between Node A and Node B.

Figure 2:
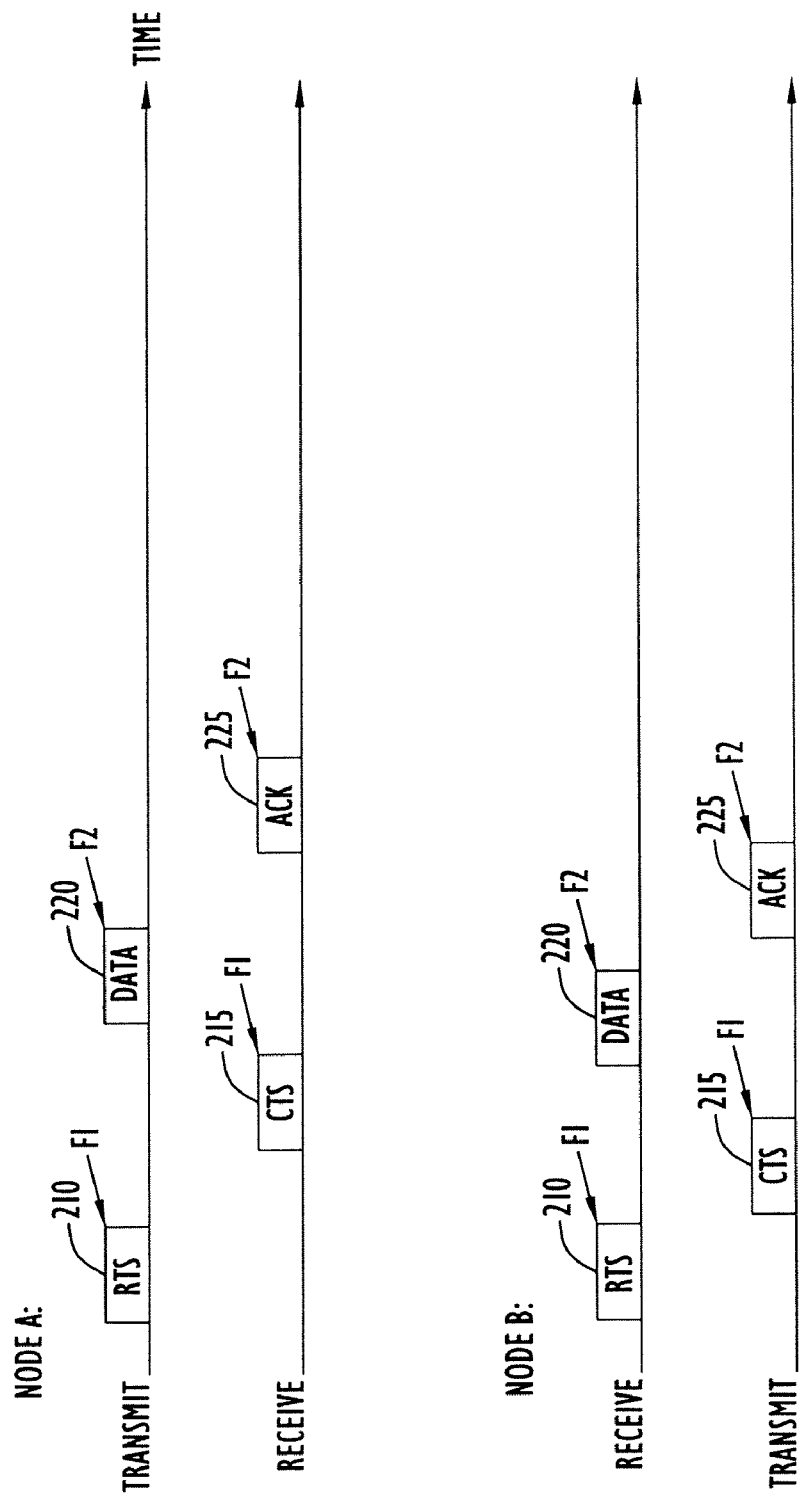
FIG. 2 is a variant of FIG. 1, wherein associated packets are sent on different frequencies.

FIG. 2 illustrates a variant of the sequence shown in FIG. 1. Here, RTS 210, CTS 215, data 220 and ACK 225 packets are exchanged, but instead of all the packets being transmitted over the same frequency, RTS and CTS packets 210, 215 are sent over a first frequency F1 (e.g., the reservation channel), and data and ACK packets 220, 225 are transmitted over a second frequency F2 that is different from F1 (e.g., a data channel). The basic exchanges depicted in FIGS. 1 and 2 are leveraged by embodiments of the present invention, as is explained more fully below.

Embodiments of the invention provide a "power-scaled probing RTS" (PrRTS) signal or packet that is preferably arranged to follow a regular RTS packet for data delivery, preferably immediately thereafter on the very next slot in a slotted CSMA system. In the RTS packet, slots are reserved for CTS, Data, and ACK packets. Another field in the RTS packet can be designated, in accordance with embodiments of the invention, for the PrRTS packet, details of which are set forth more fully later herein.

Figure 3:
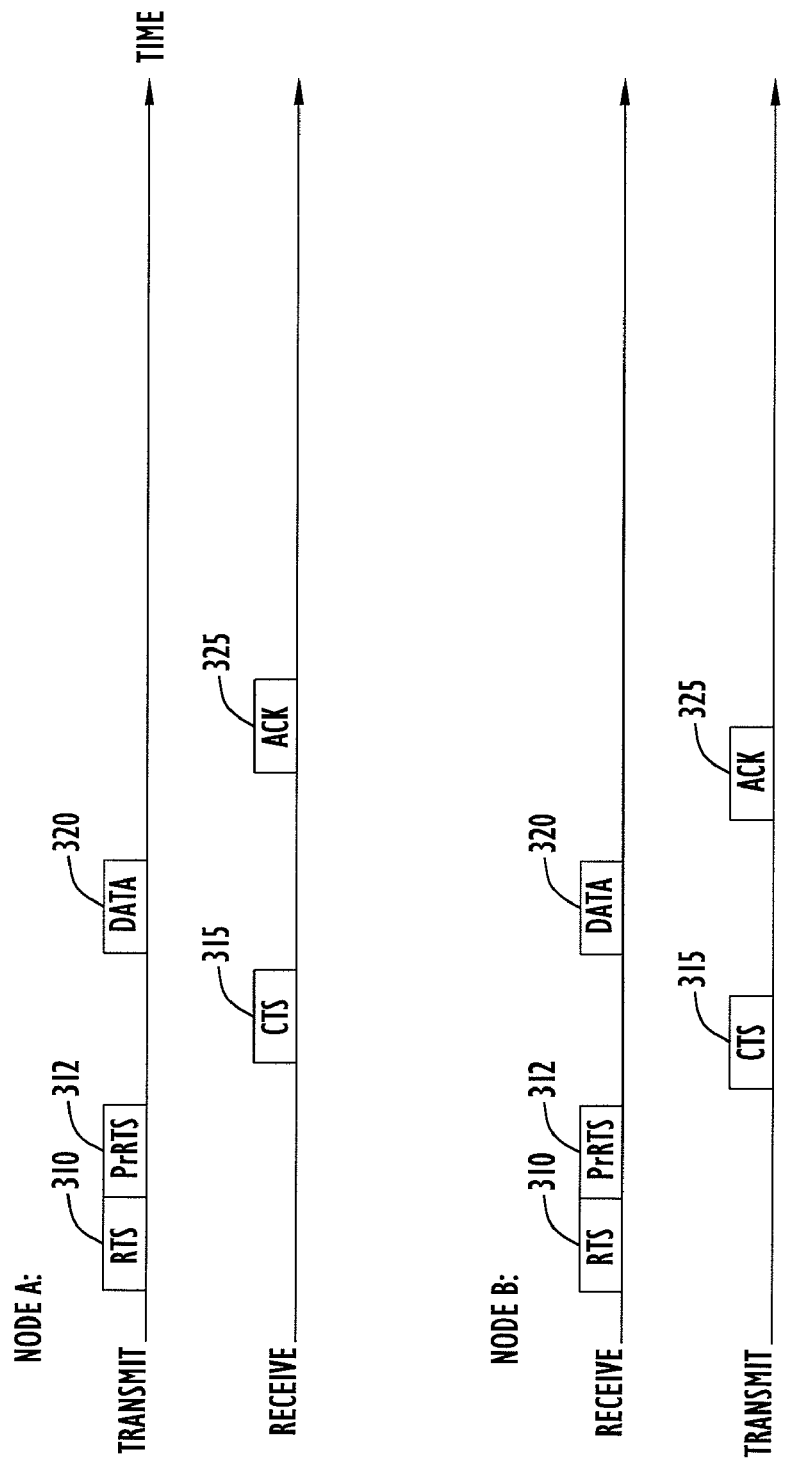
FIG. 3 is a diagram of a CSMA data exchange sequence including a probing RTS packet in accordance with an embodiment of the invention.
Figure 4:
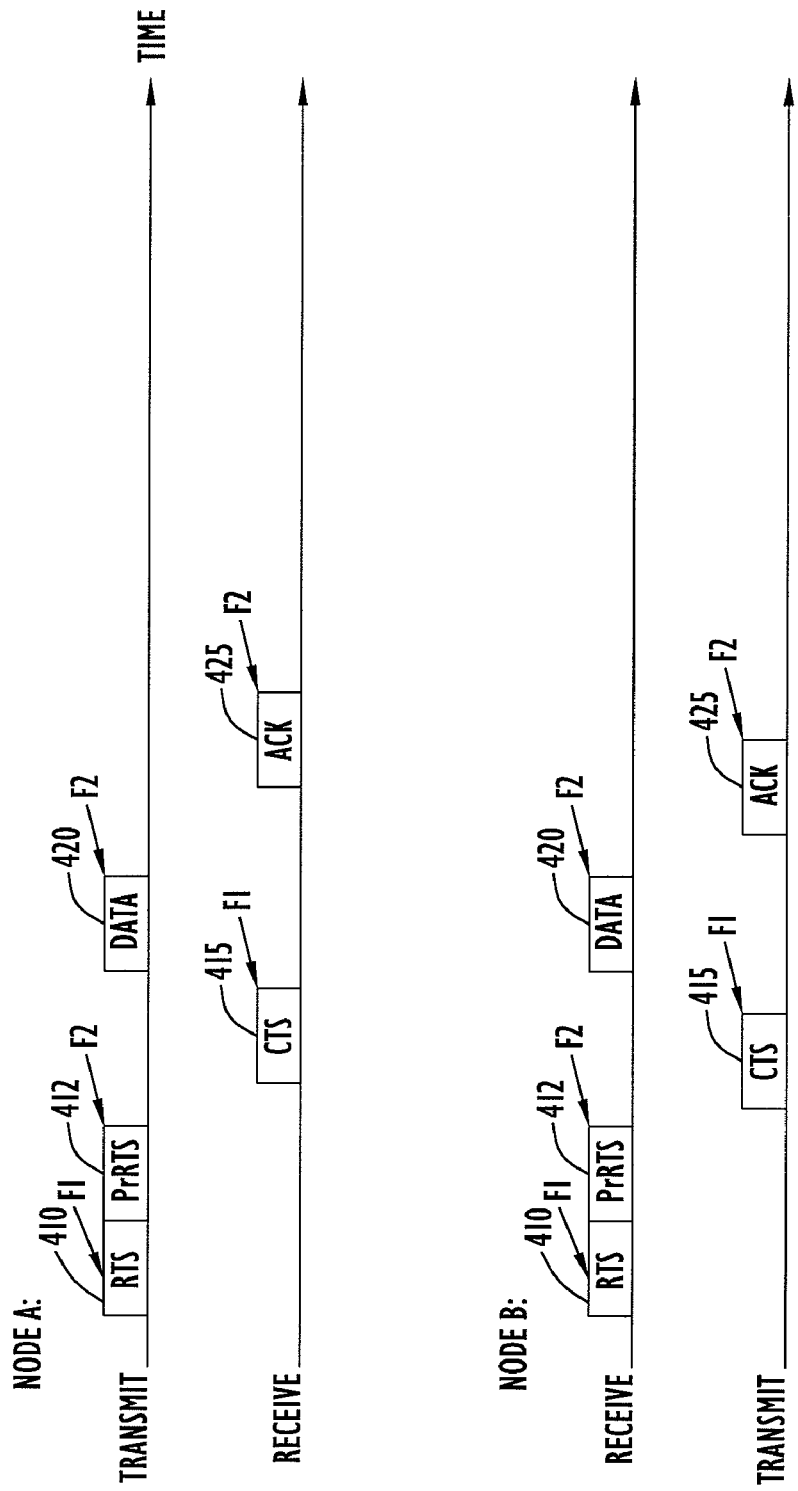
FIG. 4 is another possible implementation of a CSMA data exchange sequence including a probing RTS packet in accordance with an embodiment of the invention.

FIGS. 3 and 4 depict how a PrRTS packet or signal might be implemented in accordance with the present invention. As shown in FIG. 3, RTS packet 310 is sent by Node A and then a PrRTS packet 312 is sent immediately thereafter. Both packets are received by Node B, which responds with a CTS packet 315. Thereafter, Data packet(s) 320 are sent and received and an ACK packet 325 is sent by Node B to Node A, thereby completing the sequence. In one possible implementation, the PrRTS packet is sent on the reservation channel.

FIG. 4 depicts a variation of FIG. 3 wherein the data and reservation channels are on different frequencies. In this case, the data channel may be available for PrRTS transmission by, preferably, first listening for a channel lock-out broadcast on both RTS and CTS. If the data channel is not available for sending the probing RTS, the PrRTS may be sent on the reservation channel. As shown in FIG. 4, RTS 410 transmitted by Node A is sent over a first frequency F1 (e.g., the reservation channel) and a PrRTS packet 412 is sent over a second frequency F2, different from the first frequency F1 (e.g., the data channel). These packets, 410 and 412, are received by Node B. Node B then transmits a CTS packet 415 over frequency F1, data packet(s) 420 are transmitted by Node A, and Node B finally responds with an ACK packet 425. As will be explained more fully below, the transmission of the PrRTS, especially, over the data channel, along with a responsive CTS packet, enables the transmitting node to better determine an appropriate power level with which to send a subsequent data packet.

In a preferred implementation, nodes that hear an RTS transmission would wait until all the traffic, including the PrRTS, has passed before starting their own contention for the reservation channel. The content of the PrRTS can be the same as the RTS so the receiving radio can compare the data received in the PrRTS to that of the RTS to verify if the RF channel condition is capable of handling the succeeding data packet with the suggested settings on power level and data rate contained in both the RTS and the PrRTS packets. Of course, the content of the PrRTS may also be different from the content of the RTS packet. If the receiving node can detect both RTS and PrRTS correctly, the node sends back a CTS packet to inform the sender that the data packet can be sent at the chosen power level and data rate. Additionally, the CTS packet preferably contains the SNR for both RTS and PrRTS so the sender can compare the two SNR values to obtain a "correction factor" for the data channel, which will be explained below in further detail. The SNR of the PrRTS packet serves as a reference point for the calculation of the correction factor since the PrRTS, sent at the same data rate and power level intended for the actual data packet transmission, will have actually been demodulated by the receiving node.

Typically, SNR is computed by taking a number of sequential measurements on the received RTS packet and averaging them over the entire packet duration. Depending on the severity of the co-channel interference and the dynamics of the mobile ad-hoc channel, the measured SNR can have a wide range of values. The probing RTS (PrRTS), in accordance with the present invention, can mitigate this problem by sending the data packet only when the sender has received feedback from the receiving node on the PrRTS because the RF channel will remain fairly constant over the CSMA data transmission interval. If the channel is benign (i.e., semi-static or static), the PrRTS can be transmitted intermittently to reduce data transmission overhead.

In a slotted CSMA system, RTS, CTS and ACK packets typically occupy one slot each with the data packet occupying multiple slots. In accordance with embodiments of the present invention, PrRTS also preferably occupies one slot. By introducing one extra slot in the CSMA protocol for sending a probing RTS, the overhead is kept at a minimum. In fact, if the radio experiences multi-path Rayleigh fading with an asymmetrical radio channel, then the savings on the RF bandwidth would far exceed the one slot overhead in the data transmission. For any failed data transmission, multiple slots are wasted. In addition, any failed data transmission ties up the reservation channel, which makes the channel access contention even more problematic. Furthermore, a sender may never know with any certainty as to how the data transmission failed. For example, the sender uses the power level and data rate derived on a pre-computed lookup table based on the SNR it calculated without the feedback from the receiving node. The receiving radio could have a worse receive sensitivity than the sender. As a result, the receiving node would not be able to receive the data when the link is marginal. The receiving node may not even be able to send back an ACK or a negative ACK ("NACK") and, as a result, the sender might assume that a collision had occurred and may decide to re-send the data packet at the same power and data rate settings of the previous transmission attempt, which prolongs the channel access and adds unnecessary traffic on both the access and data channel.

The probing RTS coupled with feedback from the receiving node can overcome the problem of an asymmetrical radio link and inaccurate SNR measurement. It allows the sender to have a high probability of sending the data across the channel without any retries when the message is not collided with the other nodes' transmissions. The sender can also keep a record of the past SNR values and ACK percentage completion rate to monitor the network congestion level. For each new data transmission, the radio may use the last known data rate and power level for sending the PrRTS unless the previous transmission resulted in a failed data transmission. If the previous transmission was not successful, the radio may then re-compute the power and data rate settings based on the feedback received from the receiving node. This new adaptive technique or methodology can reduce possible unsuccessful data transmission attempts and improve network throughput by not attempting any data transmission when it is known that a radio link cannot be established with the intended recipient.

Further, the optimizations on the radio transmit power and data rate are typically performed on the reservation channel. After the first successful data transmission, the transmit power level of the PrRTS for the subsequent data transmission may be adjusted according to the data rate on the message packet that goes out on the data channel. The power may also be adjusted to account for any difference in the frequency on the reservation channel to that of the data channel.

After a radio node hears a HRTS, a BRTS, or a PRTS from a new node, it starts to send a data packet and tries to establish a radio link with the new node by using the CSMA protocol. The initial transmit power and data rate are determined based on the SNR measurement on the HRTS/BRTS/PRTS packet from a lookup table. RTS is sent out typically at maximum power and lowest data rate so that the neighboring nodes are aware of the presence of the data link between these two nodes so the data channel will not be silenced by other nodes' transmissions. Once the first data exchange attempt is successful, the sender would have a complete knowledge of the receiving node. When a bi-directional data exchange between these two nodes succeeds, both nodes would have a complete knowledge of each other in terms of the link asymmetry. Once both nodes have a complete knowledge of each other, they can both start to optimize their own radio transmission settings.

The probing RTS that goes out to initiate the first data packet transmission preferably uses a transmit power scaled to the data rate chosen for that link. The calculated power level is also adjusted for the link asymmetry for closed-loop power control. Furthermore, the transmit power is also adjusted to account for any difference in the frequency used in the data channel to that of the reservation channel. After scaling, the PrRTS becomes essentially a shorter version of the data packet (i.e., in terms of transmit power and data rate), which allows more accurate and tighter power control on the data channel.

Power Calculation for the Channel Probing RTS Packet

In the implementation of the adaptive power and data rate control technique in accordance with embodiments of the invention, the transmit power of the channel probing RTS is calculated as explained below.

The RTS packet is typically transmitted at a fixed data rate. The data channel usually has a number of data rates, including the data rate used in the RTS packet. The RTS packet is usually sent out at maximum power and typically at the lowest data rate available for the data channel. Furthermore, the frequency used on the data channel may be different than that of the reservation channel. The power adjustment on the PrRTS for the data rate difference is based on the SNR specification at the modem baseband. The power adjustment on the frequency is based on the frequency loss for the targeted radio operating environment. Typically, the free-space loss model is used for the default radio propagation setting. The transmit power on the PrRTS is calculated as shown below.

$$Pwr(PrRTS)=Pwr(data)-Pwr(data\ rate\ difference)-Pwr(frequency\ difference) \quad (1)$$

Where,

Pwr(data) is the pre-configured data message transmit power in dBm,

Pwr(data rate difference) is the SNR value difference between the data rate of the data channel and the reservation channel at baseband in dB, and Pwr(frequency difference) is the frequency loss difference between the data channel and the reservation channel in dB.

Adaptive Close-Loop Power and Data Rate Control Algorithm

When a node hears a HRTS, a BRTS, or a PRTS, it will attempt to establish a bi-directional communication with the new node by sending a RTS packet with a probing RTS. The PrRTS preferably has the same packet format as the RTS with the transmit power scaled to the data rate of the message channel and to the difference in frequency between the message channel and the reservation channel. The power-scaled PrRTS may be sent out on the very next slot right after the RTS packet on the reservation channel. In the RTS packet, a slot is reserved for PrRTS. As noted earlier, the content of the PrRTS packet may be exactly the same as the RTS packet so the receiving node can make a comparison between the data received in the PrRTS and that of the RTS.

When channel conditions permit, the receiving node sends back the CTS to let the sender know that it can send the data packet with the intended power and data rate indicated in the RTS packet. Additionally, in accordance with embodiments of the invention, the CTS packet also contains the SNR of both the received RTS and PrRTS. The sender compares the two SNRs to obtain a correction factor. The SNR on the PrRTS packet serves as a baseline for calculating the correction factor, which is used to refine the calculation for frequency loss and other environmental factors that may affect the scaling of PrRTS power.

It is preferable to send the probing RTS directly on the data channel (as noted with respect to FIG. 4). When the RTS packet is sent out, the data channel that the sender intended to use for carrying the message will be temporarily locked out. The CTS packet will confirm if the receiver is not preempted out for message reception. Thus, if the probing RTS is sent on the actual data channel, no additional channel resources are reserved except for the one slot that is needed to carry the PrRTS packet. Because the PrRTS can be sent out intermittently, the overhead for the probing RTS is kept at a minimum. The advantage of carrying the PrRTS on the data channel is that when there is an actual interference signal present on the data channel, the receiver can detect it quickly. Once the receiver computes the signal to noise and interference ratio, S/(N+I), it can estimate the interference power by comparing the SNR on the reservation channel to the S/(N+I) on the data channel. If the probing RTS is sent out on the reservation channel, the adaptive technique will eventually identify the presence of the interference and respond to it by increasing the transmit power or avoiding it by backing off.

Figure 5:
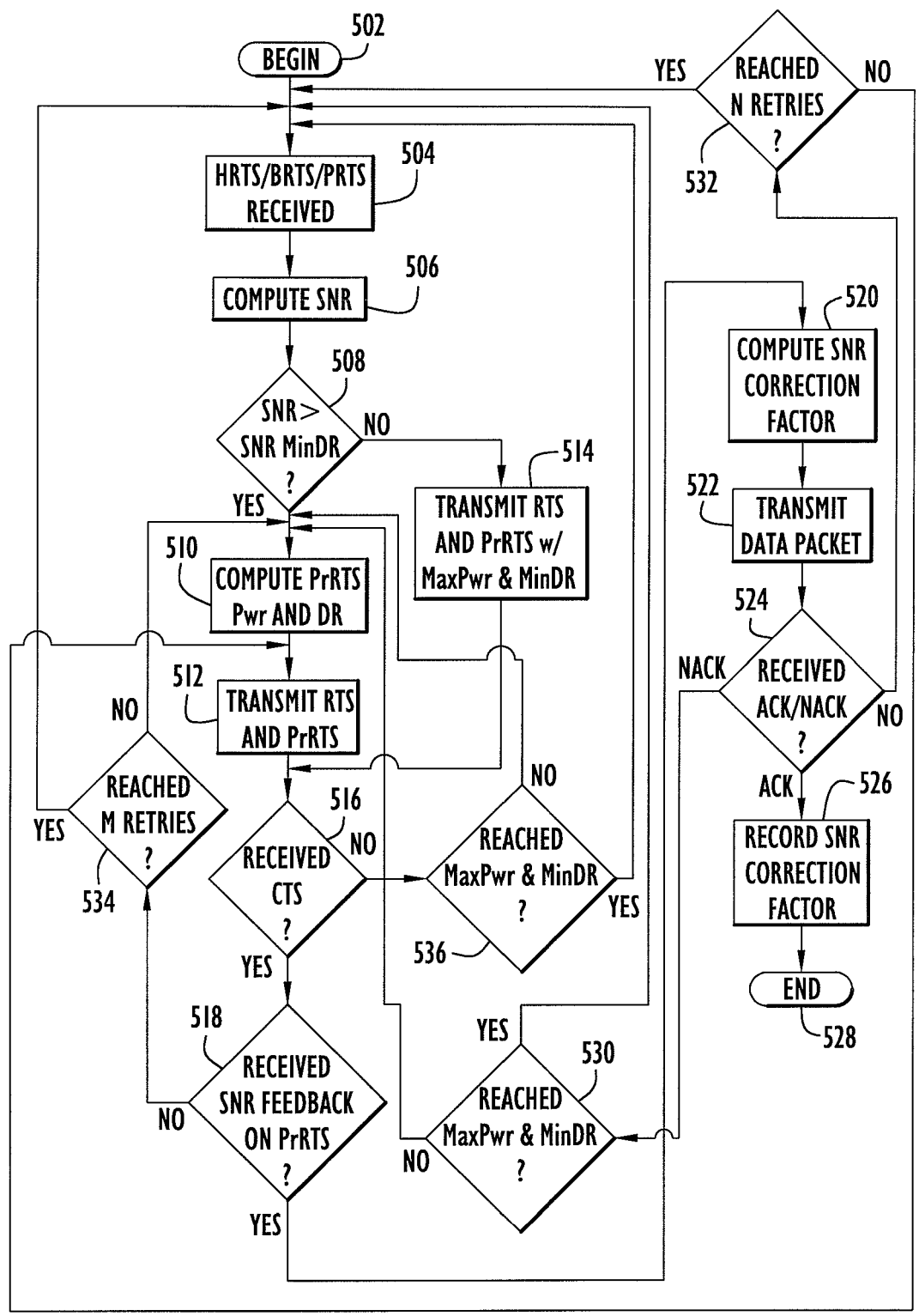
FIG. 5 shows an exemplary series of steps for transmit power control in accordance with an embodiment of the invention.

The adaptive power and data rate control technique in accordance with one possible implementation is illustrated in the flow chart of FIG. 5, and begins at step 502. After a node hears a HRTS, BRTS, or PRTS packet from a new node at step 504, the node computes the SNR on the received packet, step 506, and thereafter determines at step 508 if the calculated SNR is greater than the SNR required for data transmission using a minimum data rate (Min_DR). If the SNR is greater than the Min_DR, the node then tries to establish a bi-directional link with the new node by exchanging data with it. More specifically, the node computes, at step 510, the power and data rate for the PrRTS according to the power equation (1). Then, at step 512, the RTS and PrRTS are sent out, with the PrRTS preferably sent in the very next slot after the RTS packet.

If it was determined at step 508 that the measured SNR was less than the SNR required for the minimum data rate (Min_DR), which might be caused by inaccurate SNR estimation, the node may try to send the data packet at the maximum power and minimum data rate, as indicated by step 514, since the node had previously received the HRTS/BRTS/PRTS from the new node.

Once the RTS and PrRTS are sent out, the node switches to a receive mode (by, e.g., controlling a modem FPGA) to listen for the CTS coming from the new node. If the CTS is received at step 516, the node will check, at step 518, whether there is a SNR feedback on the PrRTS. If there is feedback, then at step 520, the node computes the correction factor based on the SNR on both RTS and PrRTS packets. Once completed, the modem is switched back to its transmit state and the node sends out the data packet by using the power and data rate setting adjusted by the correction factor, as indicated by step 522.

As indicated below, the correction factor may be provided in dB.

By using the power equation (1), the correction factor is expressed as:

$$\text{Correction Factor} = \text{SNR\_RTS} - \text{SNR\_PrRTS} - (\text{Pwr\_RTS} - \text{Pwr\_PrRTS}) \text{ in dB.} \quad (2)$$

Where SNR_RTS and SNR_PrRTS are measured SNR on the RTS and PrRTS packet respectively, Pwr_RTS is the RTS transmit power, and Pwr_PrRTS is the transmit power of PrRTS.

The correction factor accounts for any additional frequency loss beyond the free space loss.

After the node completes the message transmission at step 522, the modem is switched again back to its receive state to listen for an ACK or NACK coming from the new node. If, as indicated at step 524, an ACK is received, the SNR correction factor is stored, at step 526, in a data base for later retrieval, and the process ends at step 528.

If a NACK is received, it may be that the link is corrupted by a co-channel interference signal. The transmitting node may decide to contend with the reservation channel and start to re-send the data message by following the packet transmission sequence of RTS, PrRTS, and Data. When the PrRTS is sent out, the node may use the old power and data rate setting before the SNR correction. The data message is typically sent by increasing the power first, and then decreasing the data rate on the data channel until both power and data rate reach their respective limit. When that happens, as indicated at step 530, the node will stop trying to establish a link with the new node by noting that the data channel might have been corrupted by interference. The process then returns to step 504.

Referring again to step 524, if neither an ACK nor a NACK is received, the transmitting node may also decide to contend with the reservation channel and start to re-send the data packet to the new node. The power on the data channel will preferably be increased first, and then the data rate will be lowered until the maximum power and the lowest available data rate are reached by the N-th retry. Power needs to be increased on the data channel in case an interference signal is present. As indicated by step 532, after N retries (N is a configurable parameter), the node will stop trying to establish a radio link with the new node and park on the reservation channel by noting that collisions might have occurred or the data channel might have been corrupted by the interference.

With reference again to step 518, in the CTS packet, if there is no SNR feedback on PrRTS, the node may re-compute the power and data rate by first increasing the power until it reaches a maximum and then by decreasing the data rate on the data channel. The PrRTS transmit power may also be adjusted according to the new setting on the data channel. After M retries (M is a configurable parameter) as indicated by step 534, the node will stop trying to establish a link with the new node and park on the reservation channel by noting that the channel at which the PrRTS was sent out (i.e., the reservation or data channel) might have been busy or corrupted by interference or that the radios were undergoing shadowing.

If no CTS packet is received from the new node at step 516, the node may re-compute the power and data rate on the PrRTS packet, by first increasing the power until it maxes out and then decreasing the data rate. After the condition of maximum power and minimum data rate is reached, step 536, the node will stop trying to establish a radio link with the new node and park on the reservation channel by noting that there might have been channel collisions, or that the radios were undergoing shadowing and the communication link could not be established.

As those skilled in the art will appreciate, the methodology described herein sets the initial transmit power and data rate by estimating the link quality using the measured SNR from the received HRTS/BRTS/PRTS packet. It then adapts to the asymmetry of the radio link between any two nodes and refines the SNR estimation based on the correction factor calculated from the feedback from the receiving node, and optimizes the radio transmission settings on each end of the link.

After the first successful data transmission, the transmit power on the data channel is preferably not decreased until there is a number of successful data transmissions to ensure that the radio will get the next message across the channel. This also prevents the radio from adjusting the transmit power too often, which may cause the channel throughput to drop. From the perspective of conserving battery power, each unsuccessful data transmission will result in more drain on the battery than if the transmit power was kept the same from the previous successful transmission. A failed data transmission not only results in more energy loss per message due to the radiated energy on both the reservation and the data channel, it also adds more traffic on the access channel. In accordance with embodiments of the present invention, only after K successful message transmissions (K is a configurable parameter that in part depends on the dynamics of the RF environment in which the radios are operating within) may the transmit power be adjusted based on the feedback received in the CTS packet. The data rate can also be adjusted based on the feedback from the probing RTS via the correction factor. When the channel condition improves from the previous data transmission, the data rate is increased first. After a K number of successful data transmissions, the transmit power is lowered only when the data rate reaches a maximum. When the channel condition starts to degrade, transmit power is increased first. The data rate is then lowered after the transmit power reaches its maximum. All the power level settings and data rate adjustments are preferably based on the feedback of the probing RTS packet via the correction factor.

Figure 6:
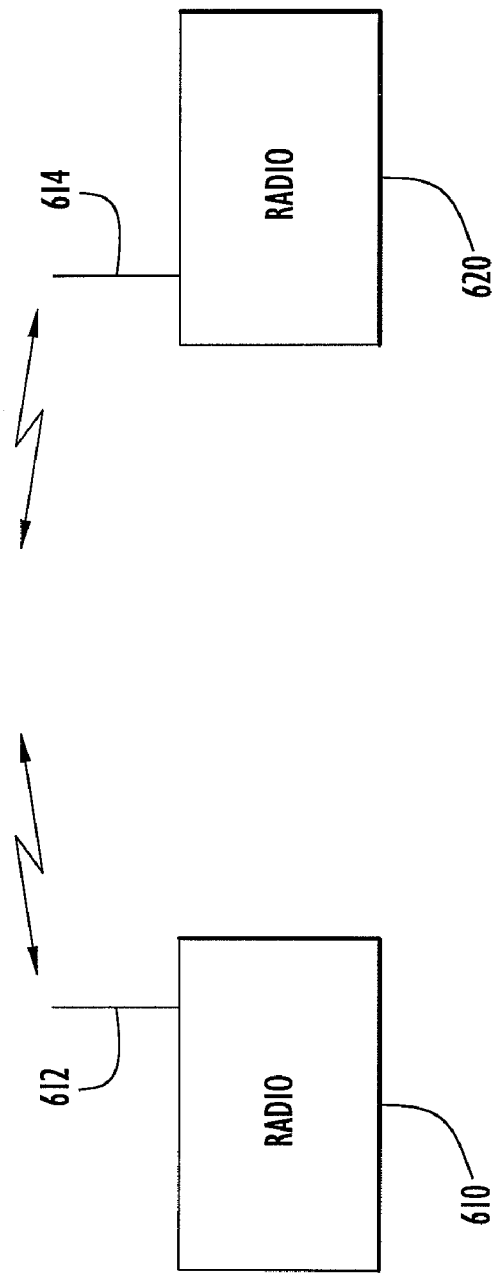
FIG. 6 shows radios that may be operating in accordance with features of the present invention.

FIG. 6 shows two radios 610, 620 (or nodes) with respective antennas 612, 614 arranged to operate as a network or as a radio link in an overall system that may comprise more than 2 nodes. These devices are capable of transmitting and receiving signals wirelessly (or over a wired connection) between them, as shown. As used herein and in the claims, radios 610, 620 (or, generally, nodes) may be any device capable of transmitting and/or receiving signals, including but not limited to: a fixed-position or mobile RF transmitter or receiver, a handheld or body-mounted radio; any type of wireless telephone (e.g., analog cellular, digital cellular or satellite-based); a pager or beeper device; a PDA; a radio carried on, built into or embedded in a ground-based or airborne vehicle; a satellite-mounted transmitter or receiver; or any electronic device equipped with wireless transmission or reception capabilities, including multimedia terminals capable of transmitting and/or receiving audio, video and data information. The radios 610, 620 may further be single unit transceivers or transmitter/receiver pairs that may be relatively small handheld units or may be larger units, e.g., rack-mounted devices.

The implementation or use of a PrRTS packet (along with other conventional handshaking techniques) as described herein is preferably implemented using software code running on the radios 610, 620. (A hardware implementation is also considered within the scope of the present invention and may have particular utility for certain applications; however, software implementations are typically less expensive and more easily modifiable in the field.) The software code itself may be embedded in, e.g., a read only memory (ROM) or a random access memory (RAM), and, in the latter case, may be updatable over the air.

Modeling and Simulation Results

Modeling of the performance of the technique described herein was carried out in MATLAB. Test conditions (traffic, etc.) collected on a conventional CSMA test system were used as input data in the MATLAB model. The modeling effort was concentrated on two extreme RF link conditions, one with pathloss of 110 dB and the other with 115 dB. Two UDP packet sizes were chosen: 80 and 1024 bytes.

The Monte Carlo method was used in the simulation. One million trials were executed for each simulation run. Twenty runs were simulated for each of the two RF link cases and the two packet sizes. The RF conditions and the packet sizes were chosen as the representative examples to illustrate the performance improvement gained when using the methodology of the present invention versus the conventional power control technique. The simulation results are summarized in FIGS. 6-9.

Figure 7:
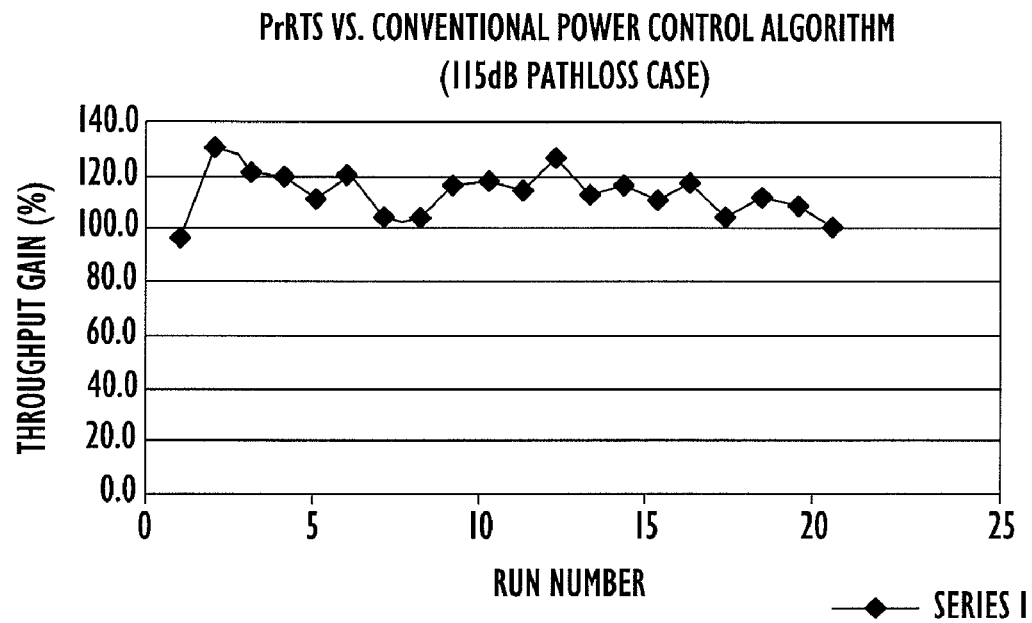
FIGS. 7-10 are graphs representing throughput gain and packet completion rate percentages in accordance with an embodiment of the present invention.
Figure 8:
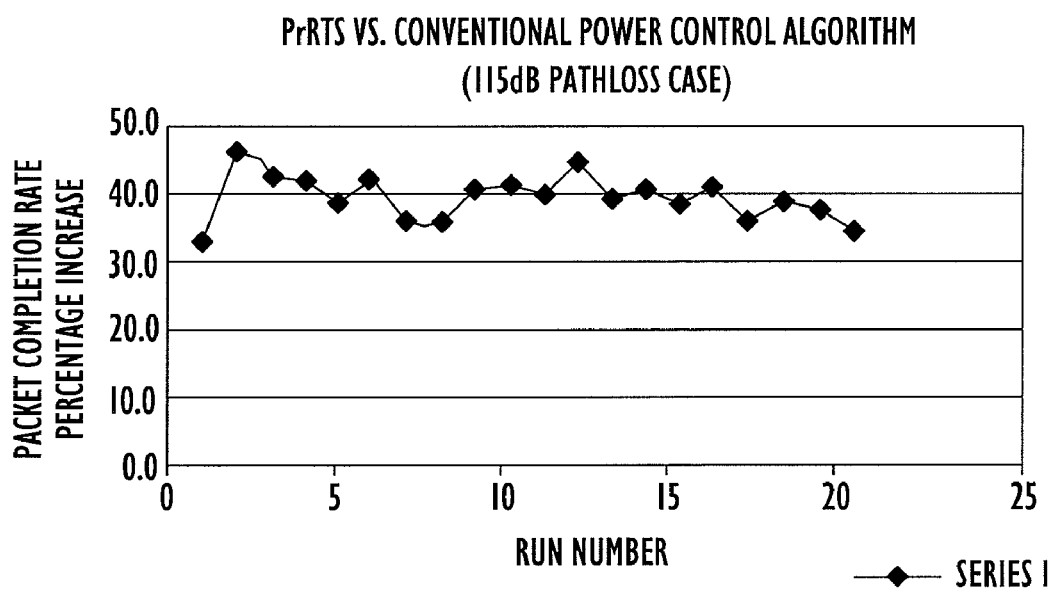
Figure 9:
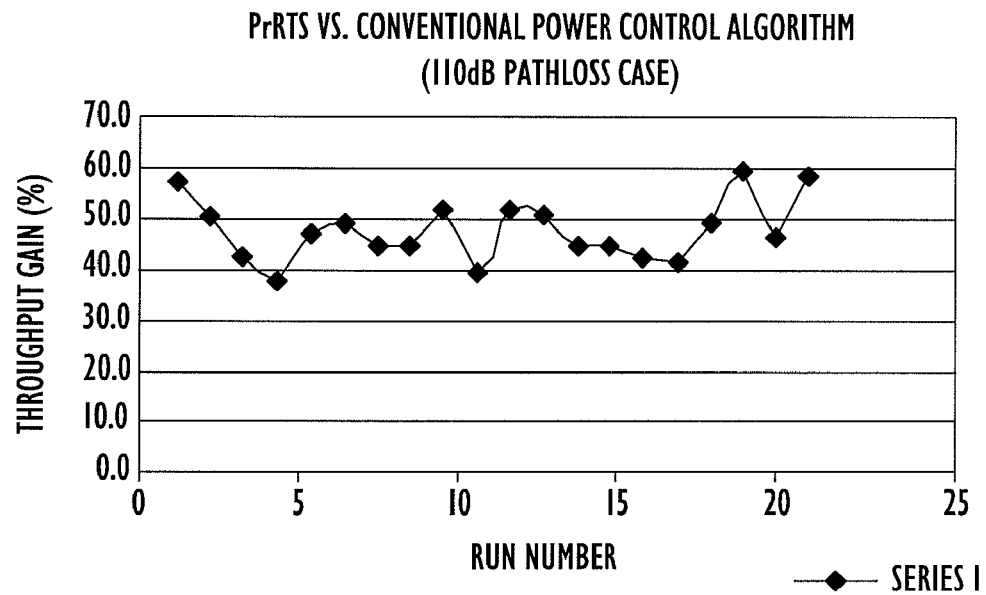
Figure 10:
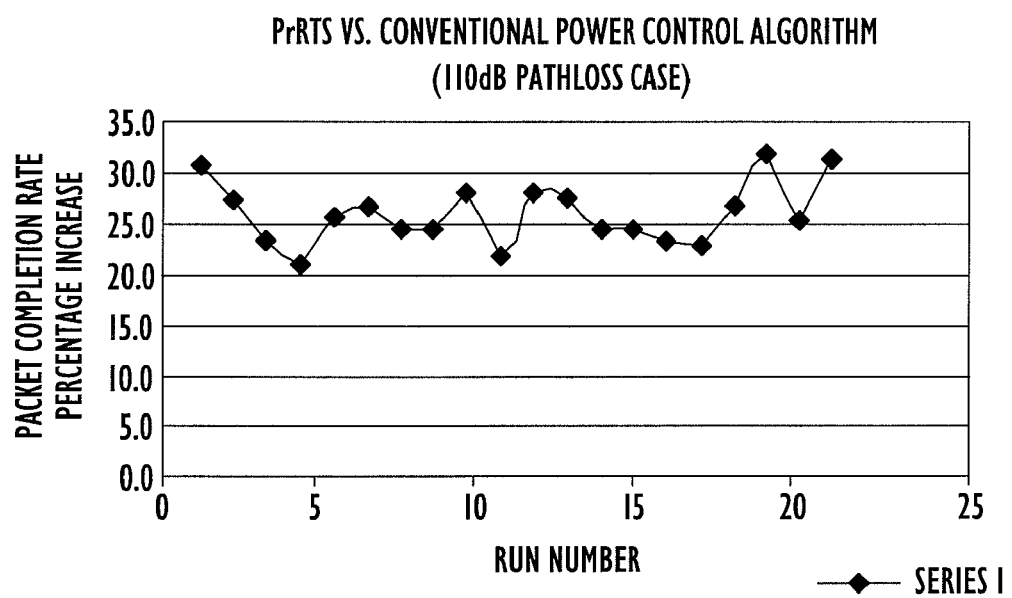

In FIGS. 7 and 8, the throughput gain and packet completion rate improvement are around 110 percent and 40 percent respectively for 80-byte UDP packets on the 115-dB pathloss channel. The throughput gain is directly proportional to the packet completion rate. A similar performance improvement is seen in FIGS. 9 and 10 for 1024-byte UDP packets on the 110-dB pathloss channel, though the throughput gain and packet completion rate improvement are somewhat limited to around 50 percent and 25 percent, respectively.

The methodology described herein is applicable to a wide variety of mobile wireless communication systems, especially ad-hoc tactical mobile networking systems.

The systems and methods described herein may be embodied in other specific forms without departing from the spirit or essential characteristics thereof. The foregoing embodiments are therefore to be considered in all respects illustrative and not meant to be limiting.

What is claimed is:

1. A method for controlling transmit power, comprising:
receiving one of a hello request to send (HRTS) signal, broadcast request to send (BRTS) signal and packet request to send (PRTS) signal;
computing a signal to noise ratio (SNR) for the one of the HRTS, BRTS, and PRTS signal;
computing a transmit power for a probing RTS (PrRTS) signal based at least in part on the SNR of the one of the HRTS, BRTS and PRTS signal, and thereafter transmitting both a request to send (RTS) signal and the PrRTS signal;
receiving a clear to send (CTS) signal in response to the RTS and PrRTS signals, the CTS signal including a SNR for the PrRTS signal;
computing a SNR correction factor based at least in part on the SNR for the PrRTS signal; and
transmitting a data packet at a power level that is computed based at least in part on the SNR correction factor.

2. The method of claim 1, further comprising receiving an acknowledge (ACK) signal and thereafter recording the SNR correction factor in a database.

3. The method of claim 1, further comprising, prior to computing the transmit power for the PrRTS, determining whether the SNR for the one of the HRTS, BRTS, and PRTS signal is greater than a SNR to a support a minimum data rate.

4. The method of claim 1, further comprising transmitting the RTS and PrRTS signals at a predetermined maximum power and minimum data rate when the SNR for the one of the HRTS, BRTS, and PRTS signal is less than a SNR to a support a minimum data rate.

5. The method of claim 1, wherein the transmit power for the PrRTS (Pwr(PrRTS)) is computed in accordance with the following equation:

$$\text{Pwr(PrRTS)} = \text{Pwr(data)} - \text{Pwr(data rate difference)} - \text{Pwr(frequency difference)}$$

Where,
Pwr(data) is a predetermined data message transmit power in dBm,
Pwr(data rate difference) is a SNR value difference between a data rate of a data channel and a reservation channel at baseband in dB, and
Pwr(frequency difference) is a frequency loss difference between the data channel and the reservation channel in dB.

6. The method of claim 1, wherein the SNR correction factor is computed in accordance with the following equation:

$$\text{SNR Correction Factor} = \text{SNR\_RTS} - \text{SNR\_PrRTS} - (\text{Pwr\_RTS} - \text{Pwr\_PrRTS}) \text{ in dB}.$$

Where SNR_RTS and SNR_PrRTS are measured SNR on the RTS and PrRTS signal respectively,
Pwr_RTS is the RTS transmit power, and
Pwr_PrRTS is the transmit power of PrRTS.

7. The method of claim 1, further comprising transmitting the PrRTS signal immediately after transmitting the RTS signal.

8. The method of claim 7, wherein the PrRTS signal is transmitted over a reservation channel.

9. The method of claim 1, wherein the PrRTS signal is transmitted over a data channel.

10. The method of claim 1, wherein the RTS and PrRTS signals are transmitted over different frequencies.

11. The method of claim 1, wherein a content of the PrRTS signal is the same as the RTS signal.

12. The method of claim 1, further comprising receiving an acknowledgement (ACK), a negative acknowledgement (NACK), or nothing in response to the step of transmitting the data packet.

13. The method of claim 12, further comprising recording the SNR correction factor when an ACK is received.

14. The method of claim 12, further comprising determining if a maximum power and minimum data rate have been reached, and if not, re-computing the transmit power for the PrRTS signal.

15. The method of claim 12, further comprising determining whether a predetermined number of retries have occurred if no response is received, and if not, re-transmitting both the RTS signal and the PrRTS signal.

16. The method of claim 1, wherein the method controls the transmit power of a node in an ad-hoc wireless network.

17. The method of claim 16, wherein the ad-hoc wireless network operates substantially in accordance with a carrier sense multiple access (CSMA) protocol.

18. A method for controlling the transmit power of a first wireless node communicating with a second wireless node over an asymmetric radio link in an ad-hoc wireless network, comprising:
computing an initial transmit power for a probing request to send (PrRTS) packet that is transmitted from the first wireless node and that is transmitted in connection with a request to send (RTS) packet;
receiving from the second node a clear to send (CTS) packet that includes at least a signal to noise ratio (SNR) for the PrRTS packet as received by the second wireless node;
computing a SNR correction factor based at least in part on the SNR for the PrRTS signal; and
transmitting a data packet at a power level that is computed based at least in part on the SNR correction factor.

19. The method of claim 18, wherein the step of computing an initial transmit power comprises measuring a signal to noise ratio (SNR) from one of a received hello request to send (HRTS) packet, broadcast request to send (BRTS) packet, and packet request to send (PRTS) packet from the second wireless node.

20. The method of claim 18, wherein the initial transmit power for the PrRTS (Pwr(PrRTS)) is computed in accordance with the following equation:

$$Pwr(PrRTS)=Pwr(data)-Pwr(data\ rate\ difference)-Pwr(frequency\ difference)$$

Where,
Pwr(data) is a predetermined data message transmit power in dBm,
Pwr(data rate difference) is a SNR value difference between a data rate of a data channel and a reservation channel at baseband in dB, and
Pwr(frequency difference) is a frequency loss difference between the data channel and the reservation channel in dB.

21. The method of claim 18, wherein the SNR correction factor is computed in accordance with the following equation:

$$SNR\ Correction\ Factor=SNR\_RTS-SNR\_PrRTS-(Pwr\_RTS-Pwr\_PrRTS)\ in\ dB.$$

Where SNR_RTS and SNR_PrRTS are measured SNR on the RTS and PrRTS signal respectively,
Pwr_RTS is the RTS transmit power, and
Pwr_PrRTS is the transmit power of PrRTS.

22. The method of claim 18, further comprising transmitting the PrRTS packet in a slot immediately after a slot for transmitting the RTS signal.

23. The method of claim 22, wherein the PrRTS packet is transmitted over a reservation channel.

24. The method of claim 18, wherein the PrRTS packet is transmitted over a data channel.

25. The method of claim 18, wherein the RTS and PrRTS packets are transmitted over different frequencies.

26. The method of claim 18, wherein the first wireless node and the second wireless node communicate substantially in accordance with a carrier sense multiple access (CSMA) protocol.

27. A method for controlling transmit power, comprising:
computing a signal to noise ration (SNR) for one of a received hello request to send (HRTS) packet, broadcast request to send (BRTS) packet and packet request to send (PRTS) packet;
transmitting a request to send (RTS) packet and a probing request to send (PrRTS) packet, wherein a transmit power for the PrRTS packet is determined at least in part on the SNR of the HRTS, BRTS and PRTS packet;
receiving a clear to send (CTS) packet in response to the RTS and PrRTS packets, the CTS packet including a SNR for the PrRTS signal;
computing a SNR correction factor based at least in part on the SNR for the PrRTS signal; and
transmitting a data packet at a power level that is determined based at least in part on the SNR correction factor.

28. The method of claim 27, wherein the transmit power for the PrRTS packet (Pwr(PrRTS)) is computed in accordance with the following equation:

$$Pwr(PrRTS)=Pwr(data)-Pwr(data\ rate\ difference)-Pwr(frequency\ difference)$$

Where,
Pwr(data) is a predetermined data message transmit power in dBm,
Pwr(data rate difference) is a SNR value difference between a data rate of a data channel and a reservation channel at baseband in dB, and
Pwr(frequency difference) is a frequency loss difference between the data channel and the reservation channel in dB.

29. The method of claim 28, wherein the SNR correction factor is computed in accordance with the following equation:

$$SNR\ Correction\ Factor=SNR\_RTS-SNR\_PrRTS-(Pwr\_RTS-Pwr\_PrRTS)\ in\ dB.$$

Where SNR_RTS and SNR_PrRTS are measured SNR on the RTS and PrRTS signal respectively,
Pwr_RTS is the RTS transmit power, and
Pwr_PrRTS is the transmit power of PrRTS.

30. The method of claim 27, further comprising transmitting the PrRTS packet immediately after transmitting the RTS packet.

31. The method of claim 27, wherein the PrRTS packet is transmitted over a reservation channel.

32. The method of claim 27, wherein the PrRTS packet is transmitted over a data channel.

33. The method of claim 27, wherein the RTS and PrRTS packets are transmitted over different frequencies.

34. The method of claim 27, wherein a content of the PrRTS signal is the same as a content of the RTS signal.

35. The method of claim 27, wherein the method controls the transmit power of a node in an ad-hoc wireless network.

36. The method of claim 35, wherein the ad-hoc wireless network operates substantially in accordance with a carrier sense multiple access (CSMA) protocol.

* * * * *